Oct. 13, 1925.
R. BOBO
SPRING DEVICE
Filed Oct. 21, 1922
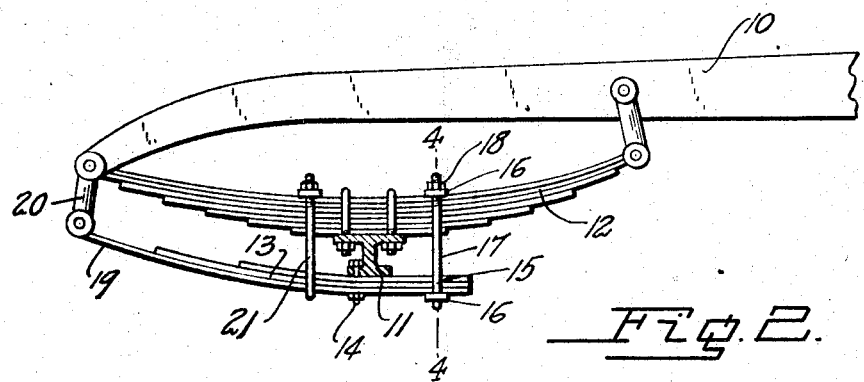
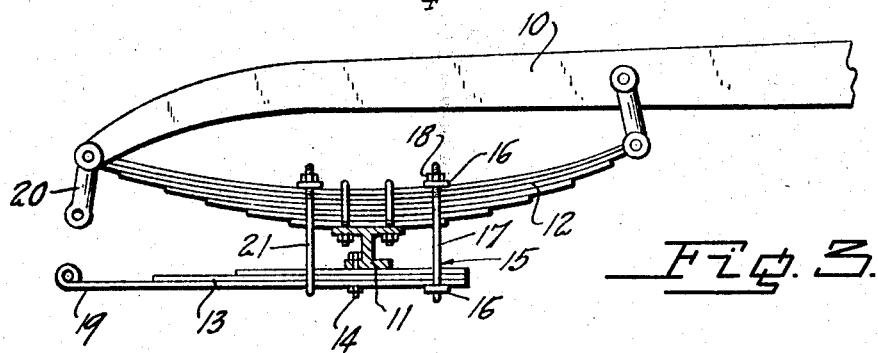
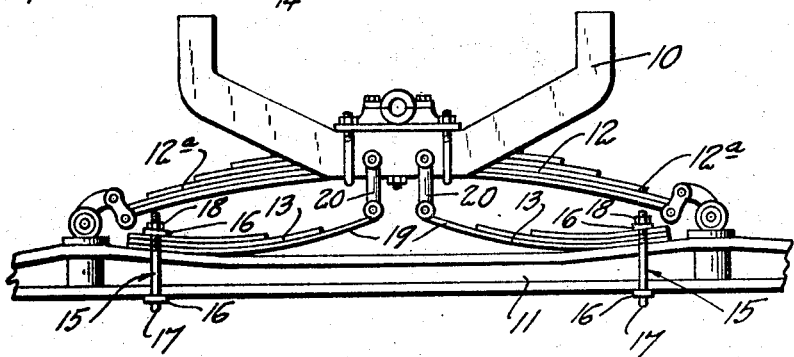
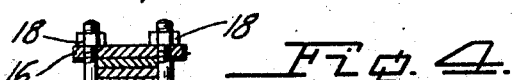
Inventor
Ruben Bobo
By Watson E. Coleman
Attorney
1,557,237

Patented Oct. 13, 1925.

1,557,237

UNITED STATES PATENT OFFICE.

RUBEN BOBO, OF MOLINE, ILLINOIS, ASSIGNOR TO HAWKEYE INVENTION CO., OF DAVENPORT, IOWA.

SPRING DEVICE.

Application filed October 21, 1922. Serial No. 596,032.

*To all whom it may concern:*

Be it known that I, RUBEN BOBO, a citizen of the United States, residing at Moline, in the county of Rock Island and State of Illinois, have invented certain new and useful Improvements in Spring Devices, of which the following is a specification, reference being had to the accompanying drawings.

This invention relates to improvements in spring devices, and an important object of the invention is to provide an attachment for vehicle springs and more particularly for the springs of motor vehicles by means of which the rebound action of the spring is checked.

A further object of the invention is to provide a device of this character which places a continuous load upon the normal springs of the vehicle, tending to tension the same, and in which the load placed upon the vehicle springs is adjustable.

A still further object of the invention is to provide a device of this character which tends to assist in flexing the vehicle springs and which accordingly during rebound action of the vehicle body resists the action of the normal springs of the vehicle which ordinarily causes the severe jostling to which the occupants of motor vehicles are subjected.

Another object of the invention is to provide a device of this character which is simple in construction and arrangement, which may be very readily applied to vehicles without materially altering the construction thereof and which will be efficient and durable in service.

These and other objects I attain by the construction and arrangement shown in the accompanying drawings, wherein for the purpose of illustration is shown a preferred embodiment of my invention and wherein like reference characters designate like parts throughout.

In the drawings:—

Figure 1 is a side elevation showing one method of applying an auxiliary spring constructed in accordance with my invention;

Figure 2 is a similar view showing the end of the spring released;

Figure 3 is a front elevation showing a second manner of applying the auxiliary spring; and Figure 4 is a section on line 4—4 of Figure 1.

Referring now more particularly to the drawings, the numeral 10 designates the frame of a car, 11 the axle thereof and 12 a spring secured to one thereof at its bight portion and to the other thereof at its ends so as to support the frame resiliently upon the axle. In the present instance, in Figures 1 and 2, the bight portion of this spring is shown as secured to the axle 11 and the end portions thereof to the frame 10, whereas in Figure 3, the bight portion is shown as secured to the frame 10 and the ends thereof to the axle 11. The connections between the spring 12, frame 10 and axle 11 will be those usually employed in the construction of a car and will be in no manner altered.

Referring now more particularly to Figures 1 and 2 of the drawings, the numeral 13 designates an auxiliary spring device consisting of a plurality of leaves flexing oppositely from the spring 12 and secured together as by means of a bolt 14. Adjacent their ends the butt end of the spring abuts the under surface of the axle 11 with its upper face and has its extremity connected to the spring 12, as at 15. This connection consists of plates 16 adapted to be arranged upon remote faces of the springs 12 and 13 and provided with openings through which extend the arms of a U-bolt 17. The bight portion of the U bolt engages one of the plates and the other of the plates is engaged by nuts 18 adjustable upon the arms of the U bolt and by means of which the spacing of the springs 12 and 13 at this point may be regulated. It will be seen that as the nuts 18 are tightened or loosened, as the case may be, the spring 13 will fulcrum upon the under surface of the axle.

The free end 19 of the spring 13 is connected with the frame 10 by means of a shackle 20 and it will accordingly be seen that if the nuts 18 are tightened, the tension placed upon the frame and opposing the action of the spring 12 of the spring 13 will be increased, whereas if these nuts are loosened, this tension will be decreased, thus permitting a variation of the load placed by the auxiliary spring upon the frame of the vehicle. It will be seen that during operation under light loads this tension may be increased to the point where the greatest efficiency is obtained and the action of the springs is smoothest and upon an increase in the load the tension may be readily lessened to compensate for this increase. The free end of the spring before the application of the shackle 20 should assume substantially the position shown in Figure 2 so that when the shackle is applied it is placed under tension. If desired, a clevis 21 or similar device may be employed at the opposite side of the axle 11 from the connection 15 and which may be adjusted in accordance to the adjustment of the connection 15 to limit the movement of the free end 19 of the spring and prevent the butt of the spring 13 from leaving the axle 11 upon excessive downward movement of the frame.

In the form shown in Figure 3, the structure just recited is reversed. In this form two of the springs 13 are provided the butt ends of which abut the axle 11 adjacent the free ends 12ª of the spring 12, the ends 19 of these springs extending toward one another and terminating in spaced relation beneath the approximate center of the spring 12 at its point of attachment to the frame 10. These free ends are connected to the frame 10 by means of shackles 20 of any suitable construction. Adjacent the butt ends of the springs 13 a connection 15 is provided to adjustably shackle the spring to the axle 11. In this case it is the extremity of the butt of the springs which forms a pivot for the spring for adjustment instead of a point spaced from the end as in the construction shown in Figures 1 and 2. It will be noted, however, that the principle of construction above recited is adhered to.

From the foregoing it is believed to be obvious that an attachment constructed in accordance with my invention may be readily applied to a vehicle and when so applied resists the motion of the normal springs of the vehicle with a load which is adjustable and which may be varied from time to time as is found desirable. It will furthermore be obvious that this construction is capable of some change and modification without materially departing from the spirit of my invention, and I accordingly do not limit myself to such specific structure except as hereinafter claimed.

I claim:—

1. The combination with a vehicle chassis including a frame, an axle, and a cushioning spring between the frame and axle resisting movement of the frame and axle toward one another, of tensioning means connecting the frame and axle tending to force the frame and axle toward one another in opposition to the movement of the spring, including a second spring pivoted upon the opposite side of the axle from and extending in the same direction as the spring of the vehicle chassis, connections between one end of the second spring and the vehicle spring and a second connection between the opposite end of the second spring and the chassis, the first named connections being at opposite sides of the axle with respect to one another and rigidifying the spring butt to the axle in adjusted positions with relation thereto.

2. The combination with a vehicle chassis including a frame, an axle, and a cushioning spring between the frame and axle resisting movement of the frame and axle toward one another, of tensioning means connecting the frame and axle tending to force the frame and axle toward one another in opposition to the movement of the spring, including a second spring having its butt pivoted upon the opposite side of the axle from and extending in the same direction as the spring of the vehicle chassis, a connection between the butt end of the second spring and the vehicle spring at that side of the axle remote from the eye end of the second spring, and a second connection between the eye of the second spring and the chassis, the first named connection being adjustable to shift the spring butt about the axle as a pivot.

In testimony whereof I hereunto affix my signature.

RUBEN BOBO.